United States Patent [19]
Nichols

[11] 3,851,571
[45] Dec. 3, 1974

[54] APPARATUS AND METHOD FOR ENCAPSULATING EGGS

[75] Inventor: John Francis Nichols, Evergreen Park, Ill.

[73] Assignee: Nichols Products, Inc., Chicago, Ill.

[22] Filed: Aug. 28, 1972

[21] Appl. No.: 284,123

[52] U.S. Cl................. 99/450.6, 206/65 R, 264/4, 425/5, 426/136, 426/89
[51] Int. Cl.............................................. A21c 9/06
[58] Field of Search ............ 99/645, 113, 114, 170, 99/161, 171 MP, 171 LP, 196, 450.1, 450.6, 483, 484, 538; 206/46 F, 65 R; 425/5; 264/4; 420/89, 100, 136, 138, 139, 140, 211

[56] References Cited
UNITED STATES PATENTS

| | | | |
|---|---|---|---|
| 2,513,852 | 7/1950 | Donofrio | 264/4 X |
| 2,525,096 | 10/1950 | Damuth | 99/196 |
| 2,597,986 | 5/1952 | Halstead | 264/4 X |
| 2,660,530 | 11/1953 | Adams | 99/161 X |
| 2,813,800 | 11/1957 | Rasky | 99/196 |
| 3,321,316 | 5/1967 | Paolis et al. | 99/196 X |
| 3,367,490 | 2/1968 | Jensen et al. | 99/161 X |
| 3,640,732 | 2/1972 | Johnson | 99/114 |

Primary Examiner—Harvey C. Hornsby
Attorney, Agent, or Firm—Leo J. Aubel; Robert E. Wagner; August E. Roehrig, Jr.

[57] ABSTRACT

This invention discloses an apparatus and method whereby the liquid egg yolk and liquid egg white can be encapsulated in a container to replace the egg shell and form an egg shape including a separate full yolk which may be frozen for subsequent use.

3 Claims, 8 Drawing Figures

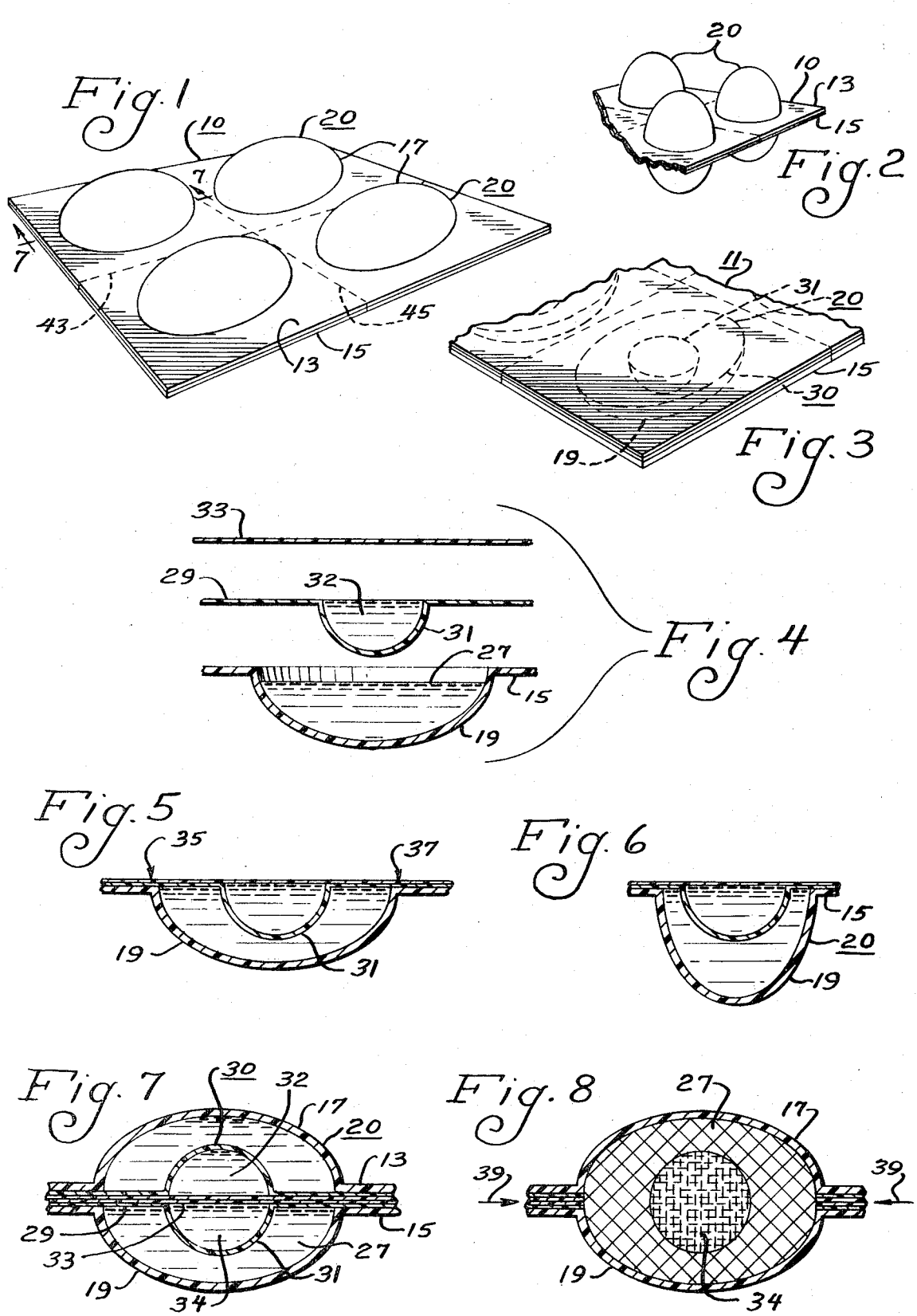

APPARATUS AND METHOD FOR ENCAPSULATING EGGS

BACKGROUND OF THE INVENTION

The packaging of foods in plastic film packages is well known in the art. The use of such plastic film containers is becoming more extensive and a number of containers have been developed for containing food material in either a pre-formed or a formable package.

Various methods and apparatus have also been developed for heating, sealing, gluing or otherwise closing the plastic packs to form a closed container for the food contained within the package.

However, the packaging of eggs presents a unique problem when it is desired that the form and shape of the basic egg be retained; that is, with the full yolk formed within an outer layer of egg white suitable for freezing, shipping and further processing such as in making hard boiled eggs.

Accordingly, it is a principal object of the present invention to provide improve apparatus and method for encapsulating and packaging eggs within a film material such as to retain the form and shape of an egg including a yolk.

It is another object of the present invention to provide a method whereby an egg may be encapsulated in the form of a raw egg.

The foregoing and other objects, features and advantages of the invention will be apparent from the following more particular description of preferred embodiments of the invention as illustrated in the accompanying drawings wherein:

DESCRIPTION OF THE DRAWINGS

FIG. 1 is a perspective view showing an egg receptacle in accordance with the invention;

FIG. 2 shows an embodiment of the invention similar to FIG. 1 wherein the eggs are positioned to be in a relatively vertical position with respect to the structure of FIG. 1;

FIG. 3 shows the lower portion of the structure of FIG. 1 indicating one-half of an egg in its encapsulated container;

FIG. 4 is an exploded view of a portion of the inventive structure;

FIG. 5 is a view similar to FIG. 4 with the various exploded segments joined to form a liquid container;

FIG. 6 is a cross sectional view showing the forming of the lower portion of an egg when it is in a vertical position such as indicated in FIG. 2;

FIG. 7 shows a cross sectional view of an egg container taken along the lines 7—7 of FIG. 1; and, FIG. 8 shows the egg assembly of FIG. 7 when it is cooked and indicates the dissolving of the interior film.

It should be understood at the outset that while the invention is particularly useful for use with eggs and egg products, it is generally applicable to other products wherein a first liquid must be separately contained within a surrounding liquid for subsequent processing, as will become clear hereinafter.

Refer now to FIG. 1, which shows an embodiment of the inventive structure essentially comprising a unique egg carton 10 including receptacles or individual containers for each egg. A pair of superposed and relatively inverted sheets 13 and 15 (see also FIG. 7) of a plastic film form mirror images one of the other, and comprise two halves 17 and 19 of an oval or egg shape which are joined along their edges to simulate individual egg shaped containers, generally labeled 20. In FIG. 3, the upper sheet 13 is removed to better show the bottom half 31 of a second relatively smaller container or ball 30 positioned within half oval 19 of container 20 as will be described hereinbelow.

FIG. 2 shows a second embodiment of the invention which is essentially identical with the embodiment of FIG. 1 except that egg containers 20 are mounted in a relatively verticle position.

Refer briefly to FIG. 7 which shows a cross sectional view of a portion of the structure of FIG. 1. Liquid egg white 27 is contained within the container 20 formed by joining halves 17 and 19 as by heat sealing as will be explained hereinbelow. A second container or ball 30 for containing the liquid egg yolk 34 is formed of two ball halves 31 and 32 inverted and joined together and mounted within the container 20. Ball 30 is positioned within the container 20 by a film material generally labeled 29 which is securely affixed to the edges of oval halves 17 and 19 of the container 20 as by heat sealing. The means and apparatus for positioning the liquid within the containers 20 and 30 will now be described.

Refer now to FIG. 4 which is an exploded view of a portion of the structure of FIG. 1 and more particularly of FIG. 3. As mentioned above, the bottom sheet 15 of the carton 10 of FIGS. 1 and 3 comprise a plastic film formed to include receptacle 19 formed in the shape of half an oval or half an egg. In assembly, the egg white liquid 27 is poured into each of the receptacles 19 and filled to a predetermined level which is lower than the level of the surface of the film sheet 15.

The sheet 29 comprises a meltable, soluble and edible material such as a film of gelatin like material as a sugary substance such as that covering certain hard shelled candy. Sheet 29 includes a plurality of circular and relatively smaller recess ball halves 31. Recesses 31 are filled with raw egg liquid 32 comprising egg yolk. Each recess 31 is filled with the liquid 32 to a position level with the sheet 29. A film 33 also of a meltable, soluble and edible film material is placed over the surface of film 29 to cover or close the recess halves 31. This assembly of sheets 29 and 33 is then lowered to position the ball halves 31 within the receptacle or recess 19 of sheet 15. As the recess half 31 containing the egg yolk liquid 32 is lowered into the liquid egg white 27, the level of the liquid 27 rises to a point level with the surface of sheet 15. The assembly will then be as shown in FIG. 5.

Next, the film materials 29 and 33 are bonded or joined with the plastic film 15 as a laminated structure such as by heating the edges of the assembly around the receptacles or recesses 19 at the points indicated by the arrows 35 and 37 (see FIG. 5) to provide a completely closed and sealed container half 19 with a second sealed container half 31 mounted interiorly of container half 19.

A second egg half is formed similarly to that described above and shown in FIG. 5. This second egg half is inverted and superposed on the other half as shown in FIG. 7 to thereby form a completely enclosed container. Note, of course, that any number of individual containers 20 as shown in FIG. 1 can be formed as a single operation dependent on the equipment used.

The egg carton shown in FIG. 1 can then be cut and shaped in any selected quantity such as in dozens, half-dozens, etc. When it is desired to separate one or more of the eggs from its associated carton, the sheet may be separated at one of the perforations 43 or 45 to select the desired number of eggs.

Further, while for present purposes, the containers are formed as oval or round shape; the containers may be of square or rectangular shape or any other useful shape. When it is desired to separate one or more of the eggs from its associated carton, the sheet may be separated at one of the perforations 43 or 45 to select the desired number of eggs.

When the egg assembly of FIG. 7 is heated during the cooking process, the film material 29, 31, 30, 33 within the container 20 melts and dissolves into the associated liquid, see FIG. 8. In other words, as the egg liquid cooks and becomes hardened, the film material 29, 30, 31 and 33 dissolves into the associated liquid.

The liquid egg hardens to form solid masses 27 and 34 of relatively different material to form a distinct egg white layer 27 and a circular egg yolk 34. The result is, of course, a complete so-called hard boiled egg. The egg may then be cut in half or separated as by taking a knife along the lines 39 in FIG. 8 and slicing the halves apart. Next, the outer film 17 and 19 may be separated from the entire solid white mass 27. The egg is now ready for use.

Other types of eggs such as scrambled eggs, poached eggs, boiled eggs etc. can likewise be prepared when using the invention.

In order to provide eggs for use as deviled eggs wherein the egg yolks are mixed with various condiments, the interior container or ball 30 can remain empty of any yolk liquid. When the eggs are cooked, the interior film material will melt leaving a round empty ball shaped spaced. A knife can be used to cut the egg halves along the lines 39 to form a half ball shaped recess in each egg half. A deviled egg mixture which can be packaged or prepared separately, can then be ladled or inserted into the semi-circular recess of the solid egg white half to form a deviled egg half.

In a modification of the foregoing structure, sheet 29 and recess 31 may be of a film material which is not meltable, soluble or dissolvable. In this embodiment, the halves of the egg carton 10 are made separately as shown in FIG. 5; and, are not joined as shown in FIG. 7. Each half container of FIG. 5 is processed and cooked separately and then the plastic film cover 33 and the intermediate sheet 29 (including recesses 31) are removed from sheet 15 (and recesses 19) to thereby leave a solid egg white mass 27 with a depression in the center into which the deviled egg matter may be inserted.

The film 33 may then be removed from the intermediate sheet 29; and, the cooked yolk 34 removed from the recess 31 and processed with condiments to form the deviled egg matter. The deviled egg matter may then be re-inserted into the depression left in the egg white 27 and served.

Another important feature of the present invention is that it enables egg liquid to be pasteurized to eliminate the danger of salmonellae, and other potentially harmful bacteria, to thereby provide a safer egg for human consumption.

Also, eggs of a good quality, but which may be graded less than top quality due for example, to their small size may be economically obtained, processed, frozen and stored for subsequent utilization.

While the invention has been particularly shown and described with reference to preferred embodiments, it will be understood by those skilled in the art, that various changes may be made without departing from the spirit and scope of the invention.

I claim:

1. An egg encapsulating apparatus separating egg white and egg yolk for freezing to maintain the appearance of a fresh egg upon subsequent cooking comprising
    container means formed in the shape of a portion of an egg shell for containing a first liquid therein,
    separating means enclosing said container means to form an enclosure of a first liquid contained therein,
    said separating means having formed therein a protrusion in the shape of a portion of an egg yolk for containing a second liquid, said protrusion extending into the enclosure formed with said container means, and
    means for enclosing the protrusion formed in said separating means.

2. The apparatus of claim 1 wherein said means for enclosing the protrusion formed in said separating means comprises a meltable and edible material soluble in the first and second liquids.

3. The apparatus of claim 1 wherein said separating means forming an enclosure of a first liquid contained in said container means and having formed therein a protrusion in the shape of a portion of an egg yolk extending into the enclosure formed thereby comprises a meltable and edible material soluble in the first liquid.

* * * * *